US012245907B2

(12) United States Patent
Pregenzer

(10) Patent No.: US 12,245,907 B2
(45) Date of Patent: Mar. 11, 2025

(54) DENTAL DEBRIS SEPARATOR

(71) Applicant: Bruno Pregenzer, Mieming (AT)

(72) Inventor: Bruno Pregenzer, Mieming (AT)

( * ) Notice: Subject to any disclaimer, the term of this patent is extended or adjusted under 35 U.S.C. 154(b) by 427 days.

(21) Appl. No.: 17/755,782

(22) PCT Filed: Nov. 6, 2020

(86) PCT No.: PCT/EP2020/081276
§ 371 (c)(1),
(2) Date: May 6, 2022

(87) PCT Pub. No.: WO2021/089774
PCT Pub. Date: May 14, 2021

(65) Prior Publication Data
US 2022/0401199 A1 Dec. 22, 2022

(30) Foreign Application Priority Data
Nov. 8, 2019 (AT) .............................. A 50953/2019

(51) Int. Cl.
*A61C 17/06* (2006.01)
*B01D 21/00* (2006.01)
*B01D 21/24* (2006.01)

(52) U.S. Cl.
CPC ........ *A61C 17/065* (2019.05); *B01D 21/0012* (2013.01); *B01D 21/0042* (2013.01); *B01D 21/2427* (2013.01); *B01D 21/2444* (2013.01)

(58) Field of Classification Search
CPC .............. A61C 17/065; B01D 21/0039; B01D 21/0042; B01D 21/2411; B01D 2221/10
See application file for complete search history.

(56) References Cited

U.S. PATENT DOCUMENTS 6,276,936 B1  8/2001  Forster et al.

FOREIGN PATENT DOCUMENTS

| DE | 8702001 U1 | 3/1987 |
| DE | 3542134 A1 | 6/1987 |
| WO | 8603669 A1 | 7/1986 |
| WO | 9512365 A1 | 5/1995 |
| WO | 0071050 A1 | 11/2000 |
| WO | 03012217 A1 | 8/2001 |

OTHER PUBLICATIONS

ISA European Patent Office, International Search Report Issued in Application No. PCT/EP2020/081276, Dec. 9, 2020, WIPO, 4 pages.

*Primary Examiner* — Bradley R Spies
(74) *Attorney, Agent, or Firm* — McCoy Russell LLP

(57) ABSTRACT

The disclosure relates to a dental debris separator having a housing in the upper region of which a drainage zone for removing particle-containing liquid from an air flow which is loaded with the liquid. The housing has an inlet for the loaded air flow, leading tangentially into the drainage zone. Downstream of the drainage zone a separation zone for removing the particles from the particle-containing liquid is provided in the housing, said separation zone descending from the drainage zone to the separation zone, the drainage zone having a curved flow path that is delimited on its lower side by a crown of baffle elements.

20 Claims, 9 Drawing Sheets

DENTAL DEBRIS SEPARATOR

CROSS REFERENCE TO RELATED APPLICATIONS

The present application is a U.S. National Phase of International Application No. PCT/EP2020/081276 entitled "DENTAL DEBRIS SEPARATOR," and filed on Nov. 6, 2020. International Application No. PCT/EP2020/081276 claims priority to Austrian Patent Application No. A 50953/2019 filed on Nov. 8, 2019. The entire contents of each of the above-listed applications are hereby incorporated by reference for all purposes.

TECHNICAL FIELD

The disclosure relates to a dental debris separator for a dental operatory.

BACKGROUND AND SUMMARY

A dental debris separator is a component that is compact as a rule and that is used at dental operatories to separate solid particles from the air-liquid mixture that is sucked from the mouth of a patient. The function here is not restricted to the separation of amalgam particles, but rather also relates to the separation of plastic particles, bicarbonate particles, and further solids from dental treatment.

A known design of a dental debris separator is presented, for example, in WO 2000/071050 A1.

It is the object of the disclosure to provide a dental debris separator that achieves an improved separation between air and the liquid charged with particles.

Against this background, the disclosure relates to a dental debris separator having a housing in whose upper region a drainage zone is formed for separating liquid containing particles from an air flow charged with the liquid, wherein the housing has an inlet for the charged air flow that opens tangentially into the drainage zone and a separation zone is formed in the housing below the drainage zone for separating the particles from the liquid that contains particles and that drops from the drainage zone into the separation zone. Provision is made in accordance with the disclosure that the drainage zone has a curved flow path that is bounded by a ring of baffle plates at its lower side.

The housing is preferably round in cross-section and extends along an axis that is substantially vertical in the installed situation. The inlet is located at the top at the housing. An outlet or outlets for the drained air flow or the ultimately particle-free liquid is/are located at the bottom at the housing.

The housing can consist of multiple parts. In an embodiment variant, the housing can comprise a lower housing part and an upper housing part placed thereon, with it being preferred that the lower housing part is closed at its base and is open toward the top and that the upper housing part is closed toward the top by a cover and has a base that divides the inner space of the housing into a drainage zone and a separation zone. The inlet is preferably located at the upper housing part. In another embodiment variant, the housing can have a central drum that is closed at the bottom and at the top by inlet and outlet covers. The inlet is preferably located at the inlet cover. The drainage zone is arranged in the region of the inlet cover or in the uppermost region of the drum.

The inlet preferably opens tangentially into the flow path. In an embodiment variant, the flow path can run inwardly spirally by an almost complete revolution until it ends at an outlet. In another embodiment variant, the flow path can be configured such that the charged air flow takes a helical flow course about the separation jacket after entering into the drainage zone and in so doing drops within the drainage zone.

The baffle plates are preferably distributed evenly and all at the same height over the extent of the flow channel and in so doing are inclined upwardly out of the horizontal in the direction of flow at an acute angle of, for example, 10°-40° or preferably 20°-30°. A curvature of the baffle plates in the direction of flow can also be provided. The spacing between the front edges and the rear edges of consecutive baffle plates that can be recognized in a plan view is preferably smaller than half the peripheral extent and preferably smaller than a quarter of the peripheral extent of the baffle plates. The front edges and rear edges of consecutive baffle plates are further preferably aligned or the baffle plates even overlap.

A stair-like contour of the baffle plates results from a configuration corresponding to one or more of the above-described preferred embodiments. This contour has the effect that the air flow in the flow path is hardly swirled by the baffle plates and that an air movement in the separation zone is additionally effectively prevented below the baffle plate ring. An agitation of the liquid collected there can thus be avoided and a sediment deposition of the particles contained in the liquid can be facilitated. There is nevertheless an effective drainage of the air flow.

In an embodiment variant of the disclosure, the baffle plates can project radially from a curved wall within the housing that defines the inner side of the flow path.

In an embodiment, web-like guide projections that project into the flow channel are provided at a wall that forms the outer boundary of the flow channel and that can be the wall of an insert inserted in the housing or a wall of the housing jacket. The guide projections can have the form of webs that are inclined rearwardly out of the vertical at an acute angle of, for example. between 5° and 30° and that are slightly convexly curved.

The lower ends of the guide projections can abut the upper side of a corresponding baffle plate in an embodiment. Provision is preferably made here that, in an embodiment variant, a gap is formed between the outer edge of the baffle plates and the inner surface of a wall that forms the outer boundary of the flow channel. The gap should adjoin the contact point in the outflow direction, that is against the direction of flow, so that water separated at the guide projection can run off to the bottom.

The boundary walls of the flow channel together with baffle contours, that is baffle plates and, where applicable, guide projections, can be formed at an insert that is received in the housing and preferably in the upper housing part. The insert can be produced as an injection molded part overall.

A collection zone in the form, for example, of a trough curved about the axis of the dental debris separator can be provided below the ring of baffle plates, optionally still in the region of the upper housing part, to collect the water separated from the air flow at the baffle contours. The water can be conducted out of this collection zone through, for example, a downspout into the separation zone.

A sedimentation zone that is bounded toward the top by a filter in the form of at least one screen base and, optionally, one or more fills is formed in the base region of the housing and optionally of the lower housing part, with the screen bases and, optionally, the fills, depleting suspended particles from the water. A suction region can be formed above the filter medium.

In an embodiment, the housing furthermore has an outlet for the treated air flow that leads from the drainage zone to the outside at the distal end of the curved flow path. The outlet is correspondingly arranged in the upper region of the housing, for example at the upper housing part.

A Venturi nozzle having a constriction into which a suction pipe leading out of the suction zone of the separation zone opens can be formed within the outlet. Due to the air flow, the outlet designed in this manner acts as an air nozzle pump by which the purified liquid can be sucked out of the drainage zone and can be conducted to the outside together with the previously drained air flow.

In an alternative embodiment, an insert part having a tubular separation jacket that separates both the drainage one and the separation zone into an outer and inner region is located in the interior of the housing. The insert part can be an injection molded part that comprises the baffle plates.

In this alternative embodiment, the flow path is preferably configured such that the charged air flow takes a helical flow course about the separation jacket after entering into the drainage zone and in so doing drops within the drainage zone. The separation jacket is composed in an embodiment variant of the disclosure of a tubular insert inserted into the housing and an annular web projecting downwardly from the housing top. The annular web is preferably molded to the inlet cover of the housing. A gap that extends over at least some of the periphery of the separation jacket can here in particular be formed between the upper edge of the jacket of the tubular insert and the lower edge of the annular web. The air that has been at least partially drained after circulation in the annular flow path can penetrate through the gap into the inner region of the drainage zone.

Provision is made in a variant of the embodiment described in the preceding paragraphs that at least some of the baffle plates have a web projecting downwardly vertically or at an angle to the vertical. Provision is made in a further embodiment that baffle panels distributed about the periphery of the separation jacket furthermore project into the flow path above the ring of baffle plates, with the baffle panels preferably extending vertically and being inclined toward the tangential direction in the direction of flow. The baffle panels represent additional baffle contours for draining the charged air flow. The baffle plates and/or the baffle panels can, for example, be molded to the outer side of the separation jacket in the embodiment described as part of the last two paragraphs.

BRIEF DESCRIPTION OF THE FIGURES

Further details and advantages of the disclosure result from the following embodiment described in the following with reference to the Figures. There are shown in the Figures.

DETAILED DESCRIPTION

Figure 1:
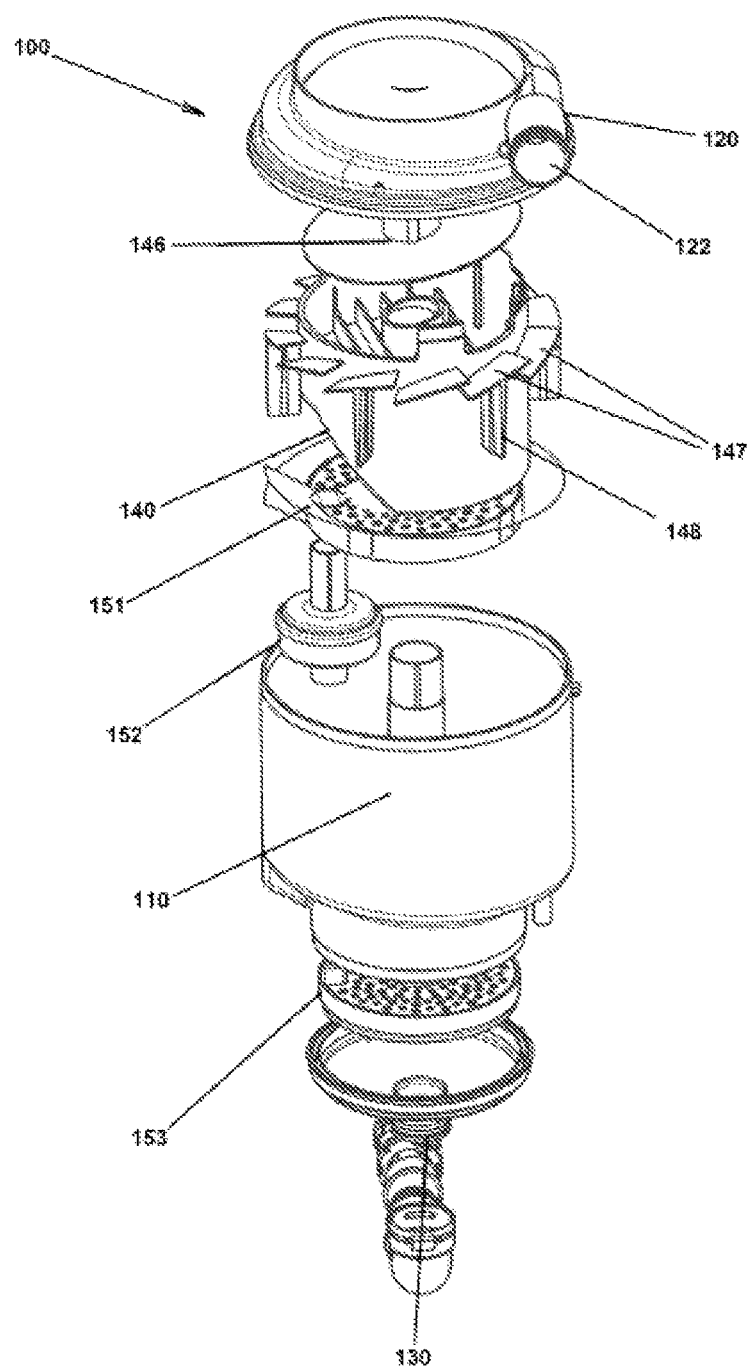
FIG. 1: an exploded view of a dental debris separator in accordance with an embodiment of the disclosure.

The separator 100 in accordance with the disclosure shown in FIGS. 1 to 8 comprises a housing of plastic that has a drum 110 that is round in cross-section and whose upper side is closed by an inflow cover 120 and whose lower side is closed by an outflow cover 130. The housing surrounds a multi-part inner space, with a drainage space 121 which is adjoined at the bottom by a sedimentation region defined in the region of the drum 110 and described in more detail in the following being defined in the region of the upwardly arched inflow cover 120.

The air-liquid mixture originating from the saliva ejector penetrates into the drainage space 121 via the inlet stub 122 arranged tangentially at the inflow cover 122 and there undergoes a flow extent that will be described more specifically in the following. In this respect, the liquid containing particles, that that is the water-saliva mixture containing particles is separated from the flow by centrifugal forces and collisions with baffle plates. The drained air flow finally flows through the central exit shaft 191 from the drainage space 121 to an air extraction connector at the outflow cover 130.

The liquid containing particles separated from the air-liquid mixture in the drainage space 121 flows, in contrast, in a sink region 111 close to the jacket up to and into a first sedimentation zone 112 at the base of the drum 110.

A tubular insert 140 whose jacket surface 141 separates a central rise zone 113 from the sink region 111 close to the jacket is inserted into the drum 110. In the rise zone 113, the liquid rises upward starting from the first sedimentation zone 112 and driven by the liquid following through in the sink region 111 and ultimately flows through an opening 114 onto a horizontal ribbed plate 142 formed at the insert 140.

A filter cartridge 151 that the liquid has to run through on its way to the opening 114 is inserted in the rise zone 113.

A V-shaped notch 145 in the jacket 141 of the insert 140 that runs from the bottom to the top increases the capacity of the dental debris separator in that the flow route for the liquid is not blocked by a rising of the sediment in the first sedimentation zone 112 up to the lower edge of the jacket 141.

A cascade of a plurality of vertical ribs 143 that bound a plurality of staggered sedimentation recesses 144 is arranged at the ribbed plate 142. An inlet opening of an overflow pipe 193 that leads into the outflow cover 130 opens on the side of the ribbed plate disposed opposite the opening 114. The liquid moving through the opening 114 onto the ribbed plate 142 gradually runs through the sedimentation recesses 144 before exiting the separator through the overflow pipe 192.

Further filter cartridges 152 and 153 are arranged in the flow route of the liquid in the overflow pipe 192 and also in the outflow cover 130.

At the upper side of the insert 140, it comprises a slanted plate 146 to cover the ribbed plate 142 or the rise zone 113 with respect to the drainage space 121 to collect any liquid possibly separated from the air in this region and to drain it into the sink region 111.

Coarse particles are largely already deposited by sedimentation in the first sedimentation zone 112.

The filter cartridge 152 can then have a filling such as fine metal threads or a fill that binds dissolved mercury ions and/or particulate amalgam alloys. A plurality of filter bases having different fills or fillings can also be provided in the filter cartridge 152, for example active carbon, zinc chips, coarse-pored zeolite, or the like. In the case of a plurality of bases, it is sensible to provide larger screens or fills at the bottom and for the grain size or the screen openings to become ever smaller toward the top.

Remaining fine solids are separated in the sedimentation recesses 144 of the ribbed plate 142. A last cleaning using ion exchangers or active carbon, for example, can take place in the filter cartridges 152 and 153.

A driving force for the extraction of liquid through the overflow pipe 192 is a vacuum that is generated by a Venturi nozzle in the outflow cover 130 that is flowed through by the air flow coming from the exit shaft 191. The vacuum of the Venturi nozzle, however, does not result in an agitation of the liquid in the sedimentation zone 112 due to the design of the dental debris separator having the insert 140, the rise zone 113, the filter cartridge 152, the ribbed plate 142, and the cover disk 146 so that the sedimentation is not disrupted there.

Figure 4:
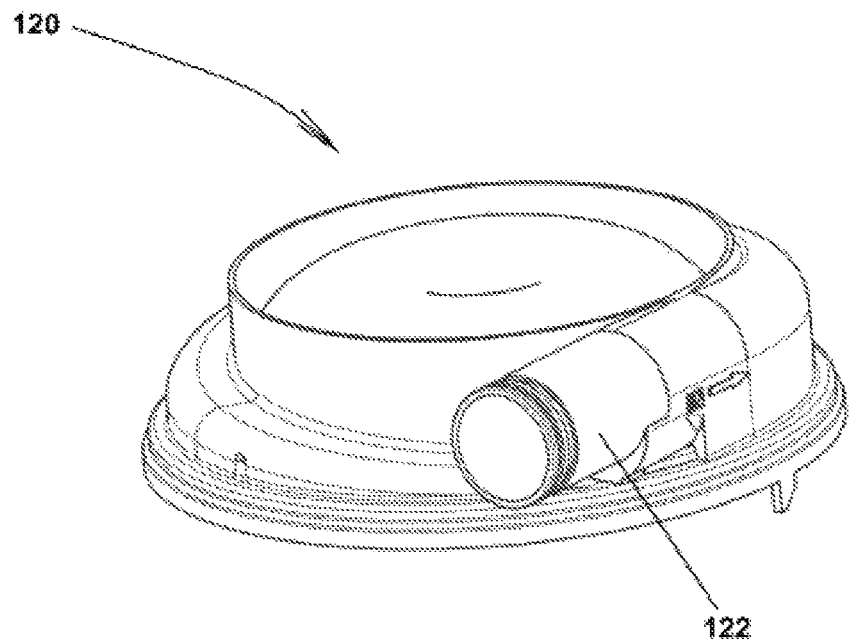
FIG. 4: a view of the inflow cover of the dental debris separator obliquely from above.
Figure 5:
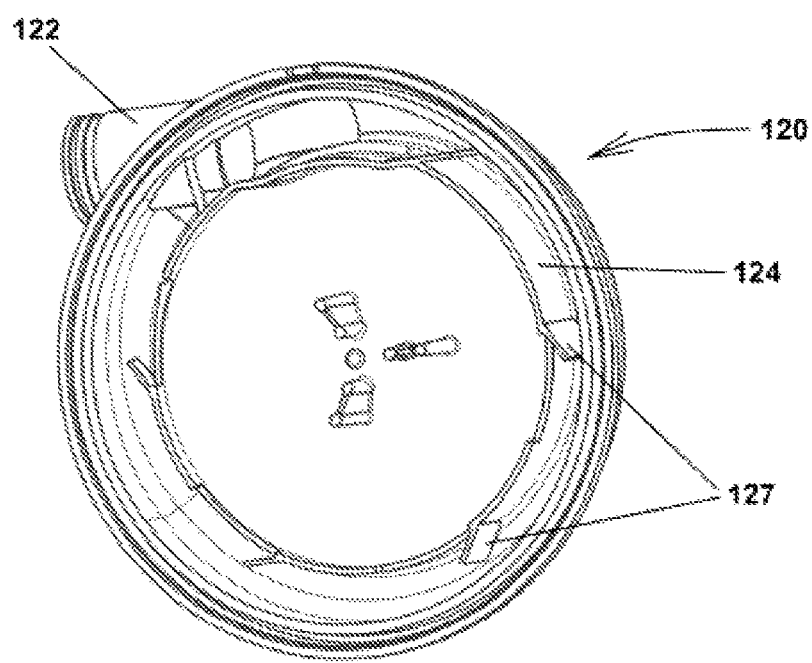
FIG. 5: a view of the inflow cover obliquely from below.
Figure 6:
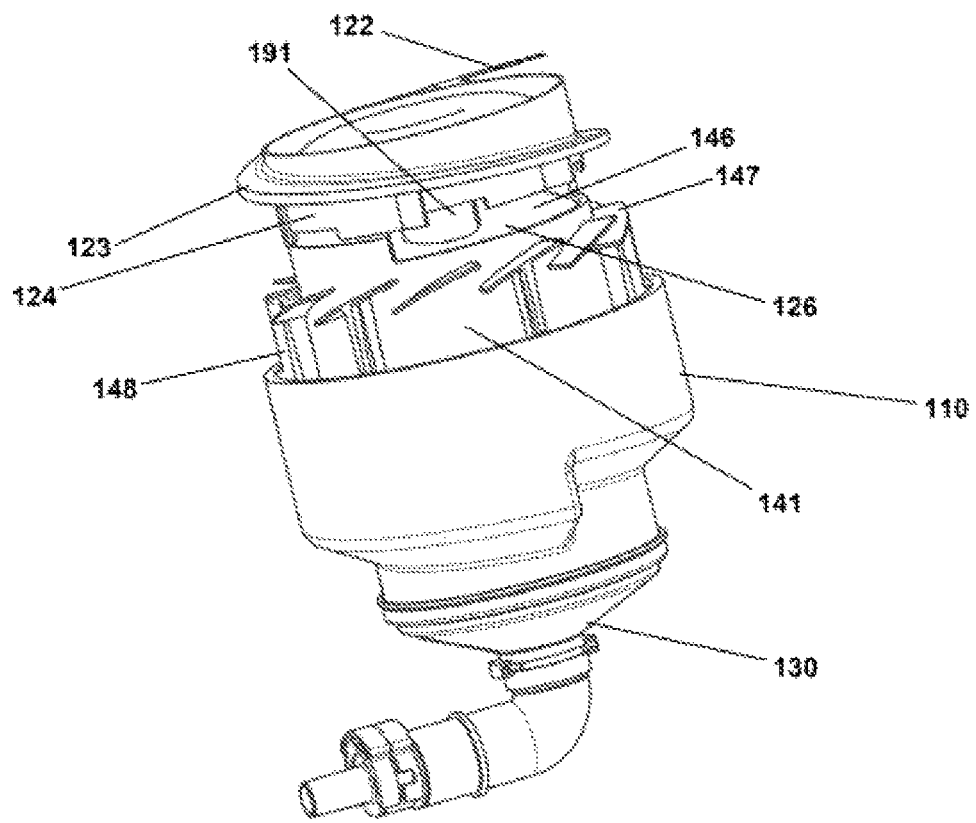
FIG. 6: a partial sectional view of the dental debris separator in which the upper part of the drum jacket and the lateral lining of the inflow cover have been cut away.
Figure 7:
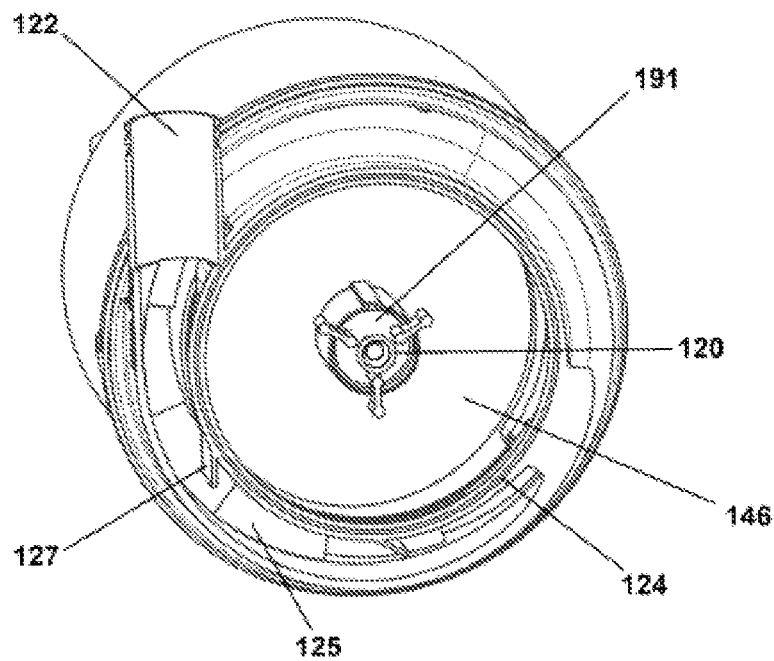
FIG. 7: a perspective view of the dental debris separator with an inflow cover transversely cut off at the level of the inflow.
Figure 8:
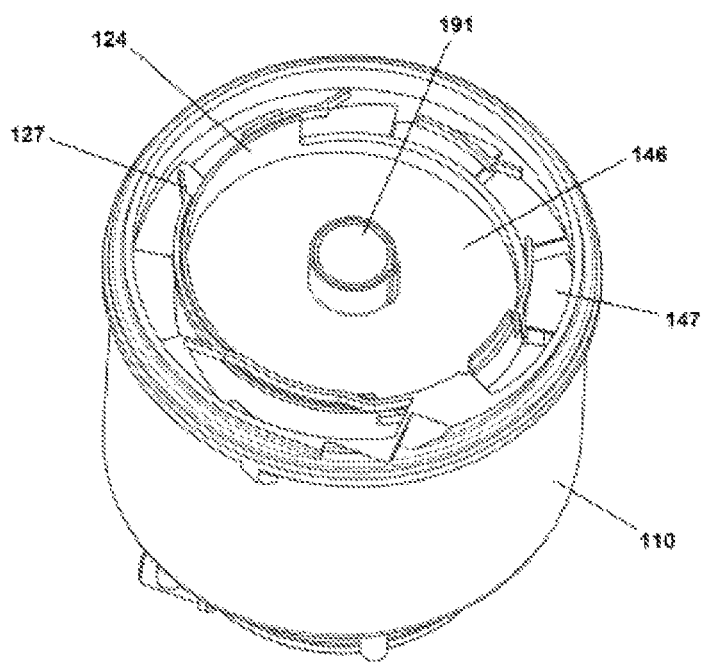
FIG. 8: a perspective view of the dental debris separator with an inflow cover transversely cut off at the level of the inflow.
Figure 9:
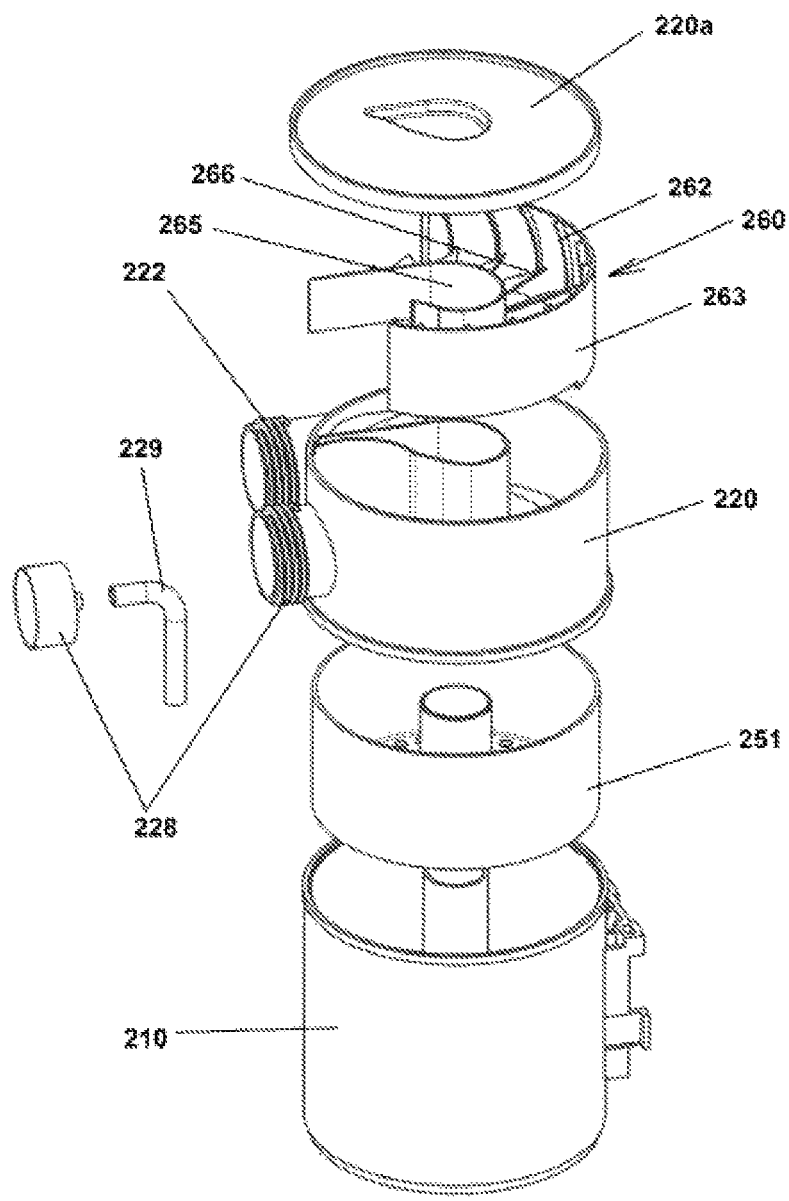
FIG. 9: an exploded view of a dental debris separator in accordance with a further embodiment of the disclosure.
Figure 10:
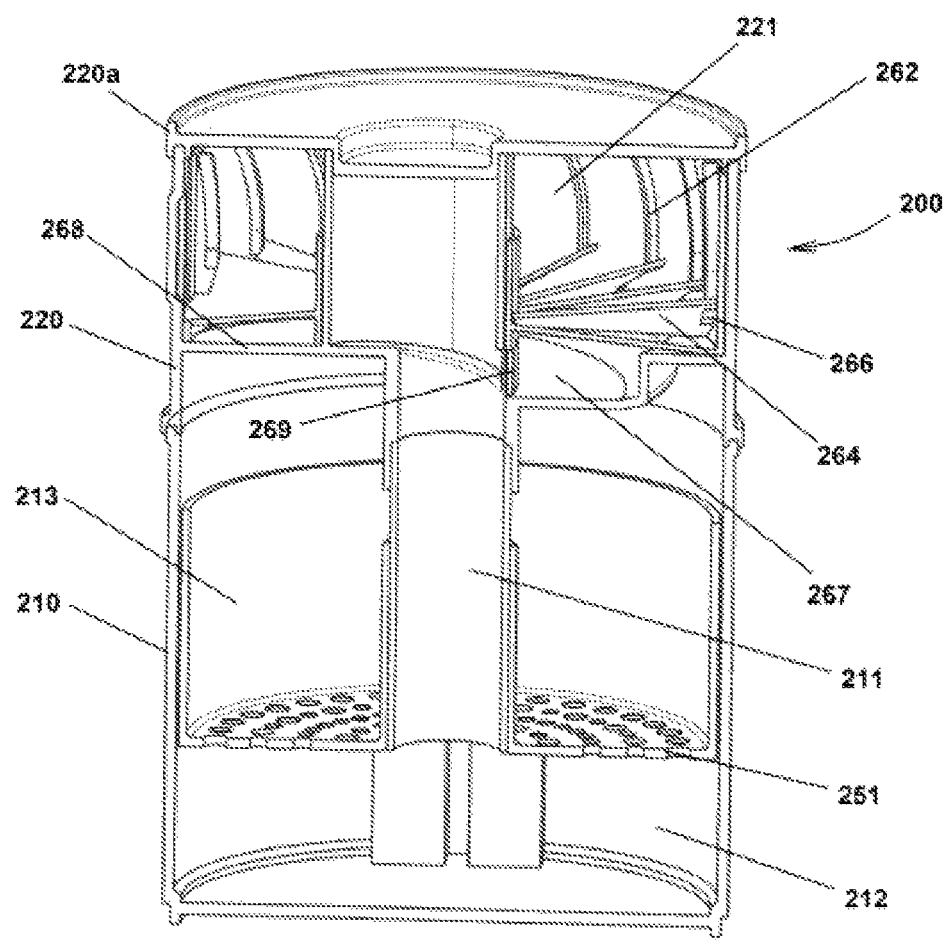
FIG. 10: a longitudinal section through this further dental debris separator.
Figure 11:
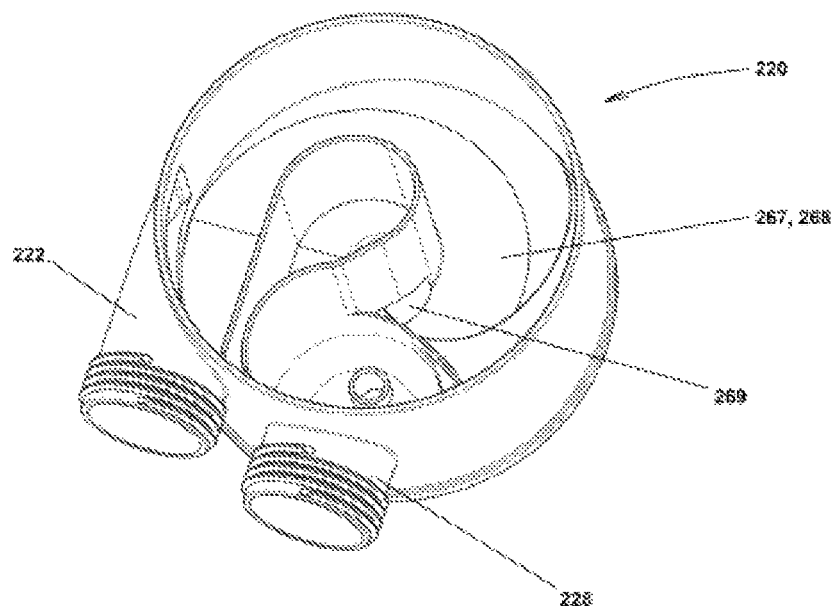
FIG. 11: a view of the upper housing part of this dental debris separator obliquely from above with a removed cover and a missing air conducting insert.
Figure 12:
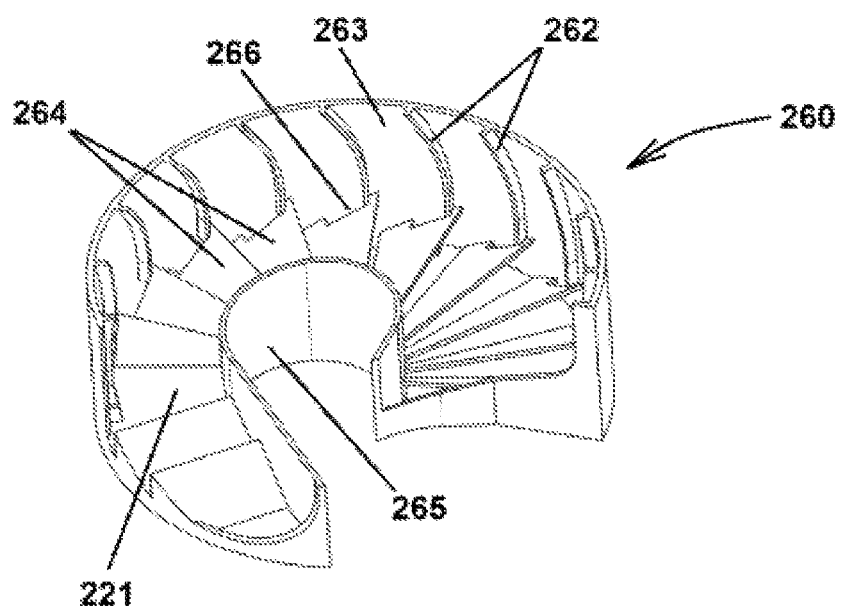
FIG. 12: a view of the insulated air conducting insert.

As can in particular be recognized in FIGS. 4 and 6, a helical guide surface 132 adjoins the tangential inlet stubs 122 and defines together with an annular web 124 in the drainage space 121 and the outer jacket of the inflow cover 120 a downwardly open flow path 126 in which the air-liquid mix winds helically downwardly about the outer surface of the web 124.

Figure 2:
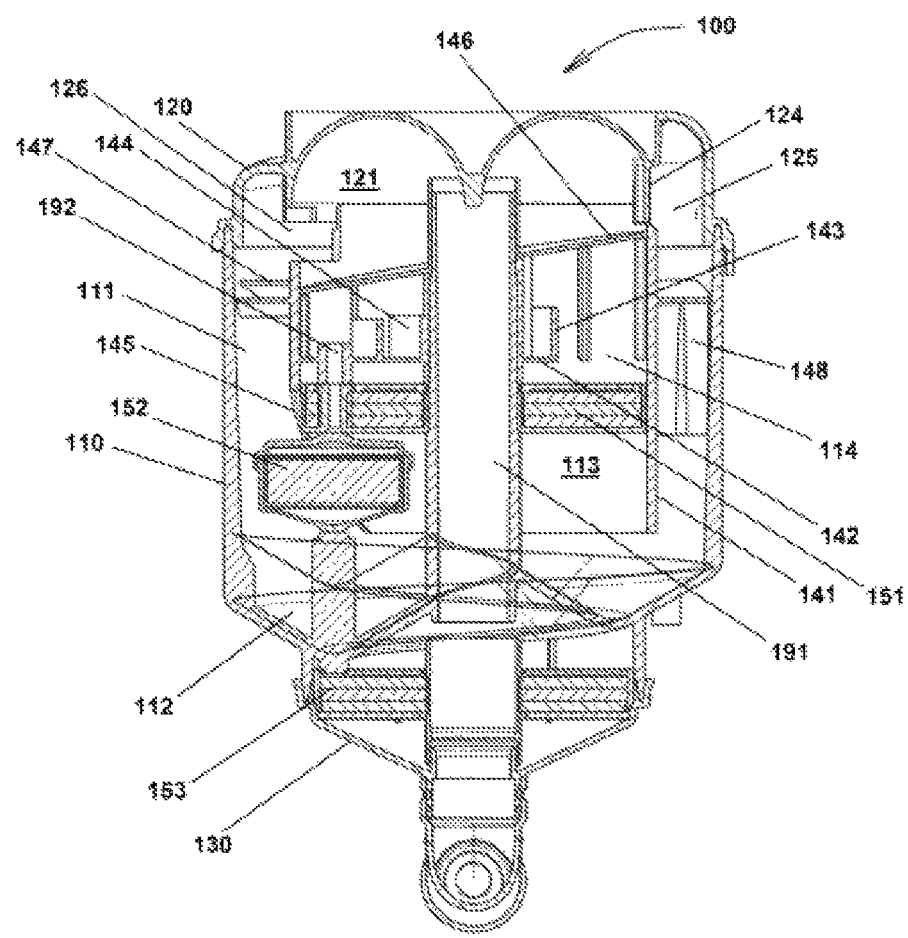
FIG. 2: a longitudinal section through the dental debris separator.
Figure 3:
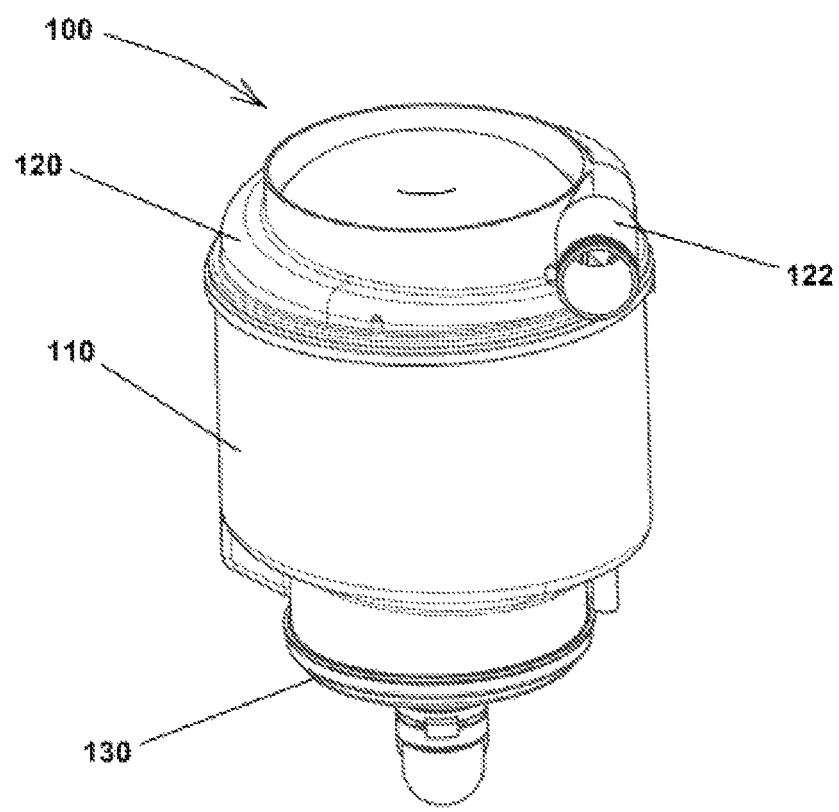
FIG. 3: a perspective outer view of the dental debris separator.

The roof of the center region of the drainage space 121 defined by the inflow cover 120 is dome-shaped and converges in the axis of the exit shaft 191 in a pointed prolongation as can in particular be recognized in FIG. 2. The sectioned tip of the prolongation of the dome-shaped roof of the inflow cover 120 can also be recognized in FIG. 7.

The web 124 has the same spacing from the center axis of the dental debris separator as the jacket 141 of the insert 140 and continues the extent of the insert jacket 141 in the drainage space 121, with a gap 126 being left open between the upper edge of the jacket 141 and the lower edge of the web 124, through which gap the at least largely drained air can penetrate from the flow path 125 into the center region of the drainage pace 121 that is downwardly bounded by the slanted disk 146 and at whose center the inlet opening of the exit shaft 191 is located in whose direction the air flows on a spiral path in the center region.

The gap 126 is not equally wide everywhere, but regions of different gap width are distributed over the periphery of the jacket 141 or web 124 and also a region in which the gap is closed (cf. FIG. 2, for instance). The different gap widths permit a defined extent of the air entry into the central region of the drainage space 121 and are oriented on the location of the inlet stub 122 and the position of the slanted disk 146.

The gap 126 is specifically closed, as can be recognized in FIG. 2, at the upper apex of the slanted disk 146 and the gap 126 is wide open at the lower apex of the slanted disk 146. This assists a drainage in the central region of the drainage space 121 that is as complete as possible and permits a backflow of water separated in the central region into the flow path 125 or into the sink region 111.

Baffle panels 127 that project into the flow path 125 and serve the drainage and that are distributed evenly over the periphery are located at the outer surface of the web 124. The baffle panels 127 extend vertically and are inclined greatly toward to the tangential direction in the direction of flow in order not to excessively swirl the air flow.

The flow path 125 merges into the sink region 111 of the drum 110 at its open lower side. A ring of plates 147 that project radially from the outer side of the jacket 141 and that are distributed evenly and all at the same height over the periphery of the jacket 141 are located in the transition region.

The plates 147 are, as can in particular be recognized in FIG. 6, inclined at an acute angle of approximately 20°-30° out of the horizontal such that they form slightly slanting baffle contours for the air flow circulating in the flow path and are slightly curved in the direction of flow. Since the plates 147 additionally project toward one another at a small spacing, with the front edge of each plate 147 ending at the same peripheral position as the rear edge of the following plate 147, a stair-shaped contour results.

This contour has the effect that the air flow in the flow path 125 is hardly swirled by the baffle plates 147 and that an air movement is additionally effectively prevented below the baffle plate ring, that is in the separation zone 111. This also prevents any agitation of the liquid in the first sedimentation zone 112 and facilitates the sedimentation. There is nevertheless an effective drainage of the air flow.

In accordance with the disclosure, the previously described baffle panels 127 are in active connection with the adjacent plates 147. They influence the inflowing multi-phase flow such that they are conducted more evenly onto the plates. The degree of separation is hereby substantially increased.

A vertical web 148 is also molded to the lower side of every second plate 147 for a prevention of a movement of air in the sink region 111 that is as complete as possible. This additionally assists the draining of the separated liquid.

The separator 200 in accordance with the disclosure shown in FIGS. 9 to 12 relates to a preferred embodiment.

This separator 200 also comprises a housing of plastic that is round in cross-section and that is in this case composed of a lower housing part 210 and an upper housing part 220. The lower housing part 210 is closed at its base and open toward the top. The upper housing part 220 is likewise open to the top, with it being closed at the top by a cover 220a. The base 268 of the upper housing part 220 that delineates the inner space of the upper housing part 220 from the inner space of the lower housing part 210 will be described in even more detail in the following.

The housing surrounds a multi-part inner space, with an air conducting insert 260 being inserted in the region of the upper housing part 220 that defines a drainage space 231 that extends inwardly in a spiral manner by an almost complete revolution. A sedimentation region that will be described in more detail in the following adjoins the air conducting insert 260 in the region of the lower housing part 210.

The air-liquid mixture originating from the saliva ejector is conducted tangentially into the drainage space 221 via the inlet stub 222 arranged at the upper housing part 220 and is led all around via an in particular cascade-like unit that will be described more specifically in the following. In this respect, the liquid containing particles, that is the water-saliva mixture containing particles, is separated from the flow by centrifugal forces and collisions of the air flow with baffle surfaces.

The baffle surfaces on the one hand comprise web-like conducting projections 262 at the outer jacket surface 263 of the air conducting insert 260 that outwardly bounds the spiral drainage space 221. The conducting projections 266 have the form of webs that are slightly inclined out of the vertical and slightly convexly inclined, with the inclination with respect to the direction of flow being such that the webs are inclined a little to the rear at the bottom and the curvature is convex with respect to the direction of flow.

The baffle projections furthermore comprise a ring of radial plates 264 that extend from the inner jacket surface 265 of the air conducting insert 260, that bounds the spiral drainage space 221 toward the inside, up to the outer jacket surface 263 and bound the drainage space 221 toward the bottom. The plates 264 are distributed evenly and all at the same height over the periphery of the inner jacket surface 265 or over the extent of the spiral drainage space 221. The plates 264 are inclined out of the horizontal at an acute angle of approximately 20°-30° so that they form slightly slanted baffle contours for the air flow in the drainage space 221. Since the plates 264 additionally project toward one another at a small spacing, with the front edge of each plate 264 ending at the rear edge of the following plate 264, a stair-shaped contour results.

The lower ends of the conducting projections 262 abut the surface of a corresponding plate 264, with a gap 266 that is formed between the plate 264 and the outer jacket 263 and through which water separated at the conducting projection 262 can run off downwardly out of the drainage space 221 adjoining the contact point. The water is conducted into this gap 266 by the contour of the conducting projections 262.

Water can also exit downwardly out of the drainage space 221 through the intermediate spaces between the plates 264 or the stair steps.

The drained air flow is conducted through an outlet stub 228 at the end of the drainage space 221, with a constriction being arranged in the outlet stub 228 at which the exiting air generates a vacuum due to the Venturi effect. A suction pipe 229 for sucking in purified water that dips into the lower housing part opens into this vacuum region. This procedure will also be described later.

The liquid that contains particles and that was separated from the air-liquid mixture in the drainage space 221 flows through an opening 269 into a downspout 221 arranged centrally in the lower housing part 210 up to and into a first sedimentation zone 212 at the base of the lower housing part 210 at a slightly inclined path 267 at the base 268 of the upper housing part 220.

Starting from this first sedimentation zone 212, the liquid rises upwardly, driven by the liquid following in the downspout 211, in an annular rise zone 213 that is outwardly bounded by the jacket of the lower housing part 210 and the is inwardly bounded by the downspout 211. A screen base 251 that the liquid runs through on its way upward is inserted in the rise zone 213. Different fills, that are not shown in the Figures, are applied to the screen base 251. Individual fills can each also be separated from one another via bases. The water rises with the particles into this fill or these fills, with the heavier particles already being sedimented in the first sedimentation zone 212 and the suspended particles remaining in the fills.

It must be stated with respect to the fills that they can consist of different materials such as active carbon, zinc chips, coarse-pored zeolite, or other materials, with the respective layers here each having different grain sizes. It can be preferred here to provide a coarser grain in the lower layers and to provide ever finer grains toward the top to achieve a grading of the separated particles and collecting the smallest suspended particles in the very fine layer at the very top.

The water then rises up further and is drawn through the suction pipe 228 into the outlet stub 228 due to the vacuum present in the outlet stub 228 formed as an air nozzle pump and exits the separator 200 together with the drained air.

The cascade-like stair structure that is formed by the plates 264 in the drainage space 221 and the conducting projections 262 are of particular importance.

Due to the shown design of the separator 200 in accordance with this embodiment variant, it is achieved in a very advantageous manner that the water runs through a rest zone by the slow rising into the different layers and is not swirled in the apparatus. It is only sucked out through the suction pipe 229 after passing through the different layers. The water is, however, at rest below it so that the sedimentation or the collection of the suspended particles can be carried out optimally here. A taking along of suspended particles of even very small grain size is effectively avoided.

The housing is produced from a plastic and is simply joined together in a plurality of parts. The air conducting insert 260 is thus designed as a separate injection molded part and is plugged into the upper housing part 220 in a simple manner.

When the separator 200 is filled with suspended particles in the insert that typically comprise amalgam and other substances, the total housing can be closed by special screw closures on a reaching of the maximum capacity and can be transported as a whole for further processing.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A dental debris separator having a housing in whose upper region a drainage zone is formed for separating a liquid containing particles from an air flow charged with the liquid, wherein the housing has an inlet for the charged air flow that opens tangentially into the drainage zone and a separation zone is formed below the drainage zone for separating the particles from the liquid that contains the particles and that drops from the drainage zone into the separation zone, wherein the drainage zone has a curved flow path that is bounded by a ring of baffle plates at its lower side, and the baffle plates are distributed evenly and/or all at the same height over the extent of a flow channel.

2. A dental debris separator having a housing in whose upper region a drainage zone is formed for separating a liquid containing particles from an air flow charged with the liquid, wherein the housing has an inlet for the charged air flow that opens tangentially into the drainage zone and a separation zone is formed below the drainage zone for separating the particles from the liquid that contains the particles and that drops from the drainage zone into the separation zone, wherein the drainage zone has a curved flow path that is bounded by a ring of baffle plates at its lower side, and the baffle plates are inclined upwardly out of the horizontal at an acute angle.

3. A dental debris separator having a housing in whose upper region a drainage zone is formed for separating a liquid containing particles from an air flow charged with the liquid, wherein the housing has an inlet for the charged air flow that opens tangentially into the drainage zone and a separation zone is formed below the drainage zone for separating the particles from the liquid that contains the particles and that drops from the drainage zone into the separation zone, wherein the drainage zone has a curved flow path that is bounded by a ring of baffle plates at its lower side, and spacing between front edges and rear edges of consecutive baffle plates that can be recognized in a plan view is smaller than half the peripheral extent.

4. A dental debris separator having a housing in whose upper region a drainage zone is formed for separating a liquid containing particles from an air flow charged with the liquid, wherein the housing has an inlet for the charged air flow that opens tangentially into the drainage zone and a separation zone is formed below the drainage zone for separating the particles from the liquid that contains the particles and that drops from the drainage zone into the separation zone, wherein the drainage zone has a curved flow path that is bounded by a ring of baffle plates at its lower side, and the baffle plates project radially from a curved wall within the housing that defines an inner side of the flow path.

5. The dental debris separator in accordance with claim 1, wherein web-like conducting projections that project into the flow channel are provided at a wall that forms an outer boundary of the flow channel.

6. The dental debris separator in accordance with claim 5, wherein lower ends of the projections abut an upper side of a corresponding baffle plate.

7. The dental debris separator in accordance with claim 6, wherein a respective gap that adjoins a contact point in a drainage direction on the upper side of the corresponding baffle plate is formed between an outer edge of the baffle plates and an inner surface of the wall that forms the outer boundary of the flow channel.

8. The dental debris separator in accordance with claim 1, wherein boundary walls of the flow channel together with baffle plates are formed at an insert that is received in the housing.

9. The dental debris separator in accordance with claim 1, wherein a collection zone is provided below the ring of baffle plates to collect water separated from the air flow at baffle contours.

10. The dental debris separator in accordance with claim 1, wherein a sedimentation zone that is upwardly delineated from a suction region by a filter is formed in a base region of the housing.

11. A dental debris separator having a housing in whose upper region a drainage zone is formed for separating a liquid containing particles from an air flow charged with the liquid, wherein the housing has an inlet for the charged air flow that opens tangentially into the drainage zone and a separation zone is formed below the drainage zone for separating the particles from the liquid that contains the particles and that drops from the drainage zone into the separation zone, wherein the drainage zone has a curved flow path that is bounded by a ring of baffle plates at its lower side, and the housing furthermore has an outlet for treated air flow that leads from the drainage zone to the outside at a distal end of the curved flow path.

12. The dental debris separator in accordance with claim 11, wherein a Venturi nozzle is formed within the outlet and has a constriction into which a suction pipe leading out of the suction pipe of the separation zone opens.

13. The dental debris separator in accordance with claim 1, wherein an insert part having a tubular separation jacket that separates both the drainage zone and the separation zone into an outer region and an inner region is received in the housing.

14. The dental debris separator in accordance with claim 13, wherein baffle panels distributed about the periphery of the tubular separation jacket furthermore project into the flow path above the ring of baffle plates.

15. A dental debris separator having a housing in whose upper region a drainage zone is formed for separating a liquid containing particles from an air flow charged with the liquid, wherein the housing has an inlet for the charged air flow that opens tangentially into the drainage zone and a separation zone is formed below the drainage zone for separating the particles from the liquid that contains the particles and that drops from the drainage zone into the separation zone, wherein the drainage zone has a curved flow path that is bounded by a ring of baffle plates at its lower side, an insert part having a tubular separation jacket that separates both the drainage zone and the separation zone into an outer region and an inner region is received in the housing, and the tubular separation jacket is composed of a tubular insert inserted into the housing and an annular web projecting downwardly from a top of the housing.

16. The dental debris separator in accordance with claim 15, wherein a gap that extends over at least some of the periphery of the tubular separation jacket is formed between an upper edge of the jacket of the tubular insert and a lower edge of the annular web.

17. The dental debris separator in accordance with claim 14, wherein the baffle plates and/or the baffle panels are molded to an outer side of the separation jacket.

18. The dental debris separator in accordance with claim 2, wherein the acute angle is between 10°-40° or 20°-30° in the direction of flow.

19. The dental debris separator in accordance with claim 3, wherein the spacing between the front edges and the rear edges of consecutive baffle plates that can be recognized in the plan view is smaller than a quarter of the peripheral extent of the baffle plates.

20. The dental debris separator in accordance with claim 14, wherein the baffle panels extend vertically and are inclined toward a tangential direction in the direction of flow.

* * * * *